(12) United States Patent
Lee (10) Patent No.: US 9,251,509 B2
(45) Date of Patent: Feb. 2, 2016

(54) CYBER OR REAL COMMUNITY SCHEDULER SYSTEM AND SCHEDULING METHOD IN CYBER OR REAL COMMUNITY

(71) Applicant: Chung Jong Lee, Seoul (KR)

(72) Inventor: Chung Jong Lee, Seoul (KR)

( * ) Notice: Subject to any disclaimer, the term of this patent is extended or adjusted under 35 U.S.C. 154(b) by 294 days.

(21) Appl. No.: 13/742,750

(22) Filed: Jan. 16, 2013

(65) Prior Publication Data

US 2014/0201274 A1 Jul. 17, 2014

(51) Int. Cl.
*G06F 13/00* (2006.01)
*G06Q 10/10* (2012.01)

(52) U.S. Cl.
CPC ............................... *G06Q 10/1093* (2013.01)

(58) Field of Classification Search
CPC .... G06Q 10/10; G06Q 10/1093; H04L 29/06; H04L 29/08072; H04L 29/06027; H04L 12/581
USPC ......................................................... 709/204
See application file for complete search history.

(56) References Cited

U.S. PATENT DOCUMENTS

| | | | | |
|---|---|---|---|---|
| 6,101,480 | A * | 8/2000 | Conmy et al. ............... | 705/7.18 |
| 8,417,785 | B2 * | 4/2013 | Fisher et al. .................. | 709/206 |
| 2002/0032592 | A1 * | 3/2002 | Krasnick et al. ................... | 705/8 |
| 2003/0149605 | A1 * | 8/2003 | Cragun et al. ..................... | 705/8 |
| 2006/0271419 | A1 * | 11/2006 | O'Sullivan ........................ | 705/8 |
| 2006/0293943 | A1 * | 12/2006 | Tischhauser et al. ............. | 705/9 |
| 2007/0201482 | A1 * | 8/2007 | Kharebov et al. ........... | 370/395.2 |
| 2008/0288316 | A1 * | 11/2008 | Chakra et al. ..................... | 705/8 |
| 2009/0006161 | A1 * | 1/2009 | Chen et al. ........................ | 705/8 |
| 2009/0165022 | A1 * | 6/2009 | Madsen et al. ................ | 719/318 |
| 2010/0100413 | A1 * | 4/2010 | O'Sullivan ........................ | 705/9 |
| 2011/0015961 | A1 * | 1/2011 | Chan ................................. | 705/9 |
| 2012/0166242 | A1 * | 6/2012 | Bentley et al. ............... | 705/7.13 |

FOREIGN PATENT DOCUMENTS

KR 1020110077313 A 7/2011

* cited by examiner

*Primary Examiner* — Robert B Harrell
(74) *Attorney, Agent, or Firm* — Novick, Kim & Lee, PLLC; Jae Youn Kim (57) ABSTRACT

Disclosed are a cyber or real community scheduler system and a scheduling method in a cyber or real community which can automatically implement meeting scheduling in a cyber or real community. A cyber or real community scheduler system includes a member information management server for distinguishing a plurality of cyber or real communities established in an SNS site from one another and managing and storing information on members of the cyber or real communities and an SNS server for providing SNS to the members of each of the cyber or real communities based on the information on the members of the cyber or real communities.

6 Claims, 4 Drawing Sheets

CYBER OR REAL COMMUNITY SCHEDULER SYSTEM AND SCHEDULING METHOD IN CYBER OR REAL COMMUNITY

BACKGROUND OF THE INVENTION

1. Technical Field

The present invention relates to a cyber or real community scheduler system and a scheduling method in a cyber or real community and, more particularly, to a cyber or real community scheduler system and a scheduling method in a cyber or real community which are capable of automatically implementing meeting scheduling in a cyber or real community.

2. Description of the Related Art

Lots of community type web sites are recently being constructed which provide a place for communication between limited friends and a place known to people who have a common topic on the Internet. Service for providing the places is called social networking service and has recently been developed in recent several years.

The outline of Social Networking Service (hereinafter referred to as 'SNS') is described below. A web site that provides SNS (hereinafter referred to as an 'SNS site') is characterized in that people can exchange various pieces of information interactively in real time through the web site like a bulletin board or a diary.

A common bulletin board or a weblog like a diary is problematic in that a number of anonymous and slanderous comments are posted. In contrast, a number of SNS sites have introduced a system in which a specific person cannot participate in the SNS sites if the existing member does not introduce the specific person. An SNS site is being developed into a tendency that the exchange of opinions or interchange from a responsible standpoint is performed by opening names or titles to each other in principle.

Accordingly, an SNS site can be used safely because anonymous and slanderous comments can be prevented from being posted. A type in which a person takes part in a community established in this SNS site (hereinafter referred to as a 'cyber community') includes a closed type in which a person cannot be registered with an SNS site if there is no introduction from the existing member and an open type in which a person can be freely registered with an SNS site. In either type, in order for a person to participate in a cyber community, the person's request for the participation has to be received so that the cyber community can approve the participation.

In participation in most cyber communities, however, a meeting at which only a few members can take part in a cyber community can be organized through a mutual dialogue, such as one-to-one or one-to-many for the purpose of friendship, association, and interchange. However, a meeting at which all the members of a cyber community can take part in the cyber community cannot be organized by a current SNS form.

Furthermore, in the organization of a common offline meeting, a manager who actually supervises a meeting and invites participants must check whether each person will participate in the offline meeting or not and the time when the person can participate in the offline meeting by asking persons through a telephone, e-mail, and/or a text message one by one because the manger cannot check pieces of information related to the appointed times of most people in advance.

SUMMARY OF THE INVENTION

The present invention has been made keeping in mind the above problems occurring in the prior art, and an object of the present invention is to provide a cyber or real community scheduler system and a scheduling method in a cyber or real community, which are capable of realizing a new form of a cyber or real community by automatically processing the organization of a meeting in a cyber or real community that is established in an SNS site according to a predetermined scheduling algorithm including the order of priority and a next order in order to facilitate the organization of the meeting.

The characteristics of the present invention for achieving the object of the present invention and performing the characteristic functions of the present invention are as follows.

In accordance with an aspect of the present invention, there is provided a cyber or real community scheduler system, including a member information management server configured to distinguish a plurality of cyber or real communities established in a Social Networking Service (SNS) site from one another and manage and store information on members of the cyber or real communities; and an SNS server configured to provide SNS to the members of each of the cyber or real communities based on the information on the members of the cyber or real communities, wherein the SNS server includes an attendance group database (DB) configured to register each of the members as one of an essential attendance group, a selective attendance group and an irrelevance attendance group based on the information on the members of the cyber or real communities; and a scheduler server configured to sequentially assign the order of priority to the essential attendance group, the selective attendance group, and the irrelevance attendance group and determine a meeting date that has been selected the most in response to information on a plurality of meeting dates known to the members of the cyber or real communities only when the number of members of each attendance group according to the order of priority is satisfied or not.

Here, if the attendance group DB in accordance with an aspect of the present invention registers the sponsor, the superintendent, and the legislative members, from among the members of the cyber or real community, as the essential attendance group, the scheduler server may include a first scheduling module for checking whether the number of members is satisfied or not by determining whether the number of members of the sponsor, the superintendent, and the legislative members included in the essential attendance group falls within a range of a predetermined numerical value or not.

Furthermore, if the attendance group DB in accordance with an aspect of the present invention registers the sponsor, the superintendent, the legislative members, and the quorum, from among the members of the cyber or real community, as the selective attendance group, the scheduler server may include a second scheduling module for checking whether the number of members is satisfied or not by determining whether the number of members of the sponsor, the superintendent, the legislative members, and the quorum included in the selective attendance group falls within a range of a predetermined numerical value or not.

Furthermore, if the attendance group DB in accordance with an aspect of the present invention registers the sponsor, the superintendent, the legislative members, the quorum, and the number of optioners, from among the members of the cyber or real community, as the irrelevance attendance group, the scheduler server may include a third scheduling module for checking whether the number of members is satisfied or not by determining whether the number of members of the sponsor, the superintendent, the legislative members, the quorum, and the number of optioners included in the irrelevance attendance group falls within a range of a predetermined numerical value or not.

Furthermore, the scheduler server in accordance with an aspect of the present invention may further include a meeting date collection module for receiving a plurality of meeting dates generated at the request of the superintendent of a specific cyber or real community, transferring the meeting schedules to the members of the specific cyber or real community, and collecting meeting dates selected by the members of the specific cyber or real community in response to the transfer; and a meeting date determination module for incorporating information on a meeting date that has been selected the most, from among pieces of information on the meeting dates collected by the meeting date collection module, into an affirmative determination corresponding to a range of a numerical value and transferring information on whether a meeting will be organized or not to all the member of the specific cyber or real community.

Furthermore, in accordance with another aspect of the present invention, there is provided a scheduling method in a cyber or real community, including the steps of (a) an SNS server receiving information on a meeting date, including a meeting object, a meeting place, and a plurality of meeting dates and times, from the superintendent of a cyber or real community; (b) the SNS server transferring the received information on the meeting dates to the scheduler terminals or a variety of devices of all the members of the cyber or real community; (c) the SNS server receiving information on whether all the members of the cyber or real community will participate in a meeting or not and on meeting dates selected by all the members in response to the information on the meeting dates; (d) the SNS server determining whether the number of members for each attendance group defined according to the order of priority is satisfied or not based on the information on whether all the members of the cyber or real community will participate in the meeting or not; and (e) if a result of the determination at the step (d) is affirmative, the SNS server extracting a meeting date that has been selected the most based on information on a first meeting date transmitted by members who will participate in the meeting, from among pieces of information on the meeting dates, and determining a meeting schedule based on the extracted the meeting date.

Here, the scheduling method in a cyber or real community in accordance with another aspect of the present invention may further include the steps of (f) the SNS server notifying the scheduler terminal or a variety of the devices of the superintendent of the extracted meeting date; (g) the superintendent generating information on the meeting based on the meeting date checked by the scheduler terminal or a variety of the devices and transmitting the generated information to the SNS server; and (h) the SNS server transferring the received information on the meeting to the scheduler terminals of all the members including the scheduler terminals of the subjects who will participate in the meeting.

Furthermore, the scheduling method in a cyber or real community in accordance with another aspect of the present invention may further include the step of (i) the SNS server generating information on the meeting based on the extracted meeting date and notifying the scheduler terminals of all the members, including a scheduler terminal of the superintendent, of the information on the meeting.

Furthermore, the information on the meeting schedule may include information on a meeting object, a meeting place, and a plurality of meeting dates and times.

DETAILED DESCRIPTION

Hereinafter, some embodiments of the present invention are described in detail with reference to the accompanying drawings in order for those skilled in the art to be able to readily implement the invention. In the drawings, similar reference numerals are used to designate the same or similar functions from several aspects.

First Embodiment

Figure 1:
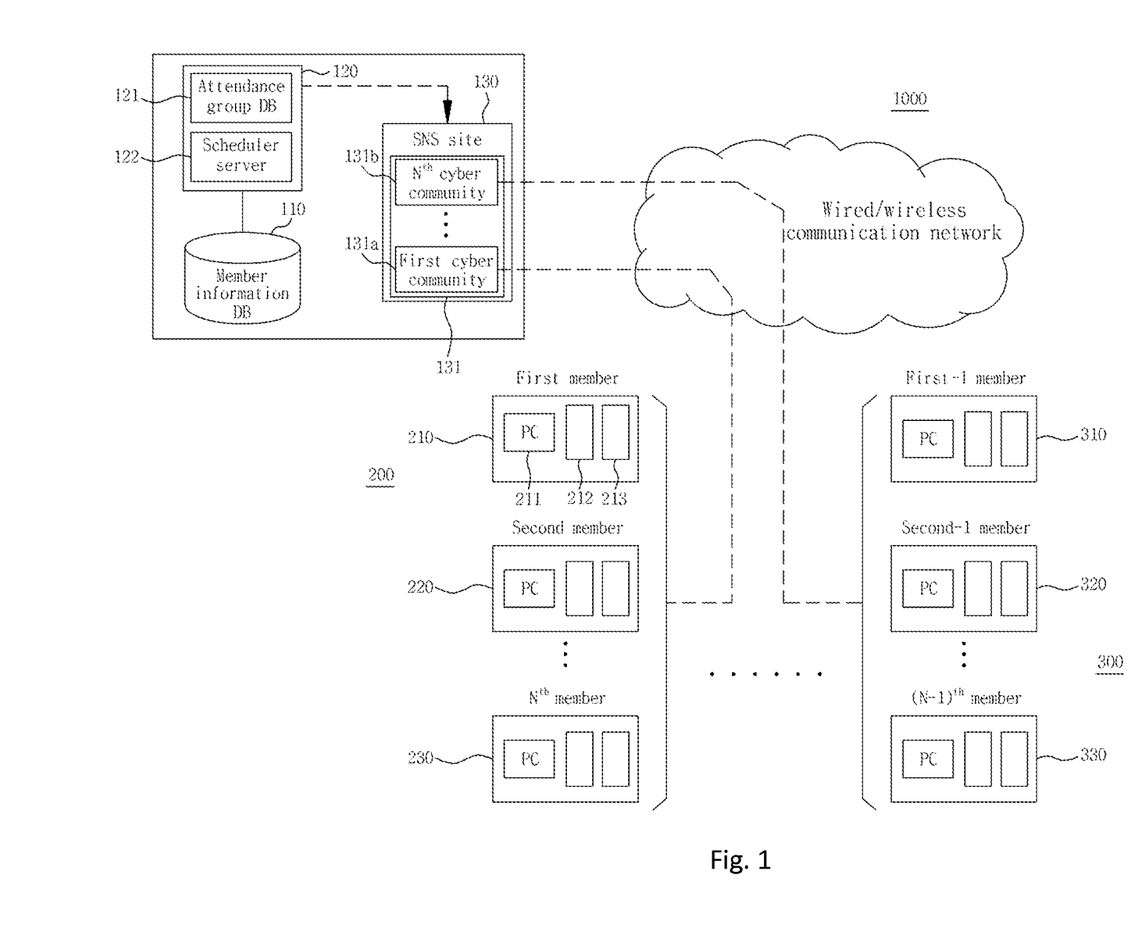
FIG. 1 shows a construction of a cyber or real community scheduler system 1000 in accordance with a first embodiment of the present invention.

FIG. 1 shows a construction of a cyber or real community scheduler system 1000 in accordance with a first embodiment of the present invention.

As shown in FIG. 1, the cyber or real community scheduler system 1000 in accordance with the first embodiment of the present invention includes an SNS scheduling server 100 and a plurality of scheduler terminal groups 200 and 300.

First, the SNS scheduling server 100 according to the present invention functions to manage an SNS site 130 so that an SNS site is established in a plurality of the scheduler terminal groups 200 and 300, manage a plurality of cyber or real communities 131, 131a, and 131b established in the SNS site 130, and manage members (e.g., register, modify, and delete members) in each of the cyber or real communities 131.

In particular, the SNS scheduling server 100 performs not only SNS that is widely known, but also provides a new form of SNS for organizing (determining) a meeting by applying a meeting scheduling algorithm to members who have been registered with each community.

To this end, the SNS scheduling server 100 of the present invention includes a member information database (DB) 110 and an SNS server 120. The member information DB 110 functions to distinguish the plurality of cyber or real communities 131, established in the SNS site 130, from one another and store and manage information on members who have been registered with each of the cyber or real communities 131.

In contrast, the SNS server 120 functions to substantially provide SNS to members for each cyber or real community based on information on the members of the cyber or real community 131 stored in the member information DB 110 and also perform the organization of a meeting by applying a new form of a scheduling scheme to the meeting, while operating in conjunction with the member information DB 110.

As a detailed scheme for implementing the scheduling scheme for the organization of a meeting, the SNS server 120 of the present invention can include an attendance group DB 121 and a scheduler server 122. The attendance group DB 121 performs a function of registering each member with any one of an essential attendance group, a selective attendance group, and an irrelevance attendance group based on information on the members of the cyber or real community 131 stored in the member information DB 110.

For example, if persons registered as the members of a first cyber or real community established in the SNS site 130 are classified into a superintendent, a sponsor, and normal members and registered, the superintendent (e.g., the superintendent can include a number of members and the superintendent can also be called a chief secretary or a manager), that is, a person who has substantially established the first cyber or real community, from among the members of the first cyber or real community, can be registered with an essential attendance group.

In addition, the essential attendance group can further include a sponsor (1 person), that is, the president, and the number of legislative members, that is, the number of members necessary to decide a meeting, from among the members of the first cyber or real community. The number of legislative members is determined depending on how many members are included in a total quorum. For example, assuming that the number of members who must take part in a meeting, from among a 1000-person quorum in the first cyber or real community, is 300 members, 600 members will become the number of legislative members. The number of legislative members can be determined by checking the number of members who have determined to take part in a meeting and which have been obtained by a scheduling algorithm to be described later.

The registration of the essential attendance group including the superintendent, the sponsor, and the number of legislative members as described above is known to all the members of the first cyber or real community. If an intention of organizing a meeting is received from some of the members, a registration condition is that some of the members are the subjects who must take part in the meeting.

In contrast, the selective attendance group is a group including members who are not the subjects who must accept a meeting, but are the subjects who hopefully attend the meeting. For example, the selective attendance group further includes conditions of a quorum in addition to a superintendent, a sponsor, and the number of legislative members. The quorum refers to a minimum number of members on which a meeting needs to be essentially approved, from among the members of the first cyber or real community. For example, assuming that a minimum number of members on which a meeting needs to be approved, from 1000 members, is 70%, 700 members (70%) become a quorum.

Furthermore, the irrelevance attendance group is a group including members whose attendance at a meeting is never important and whose degree of attendance is permitted depending on their intentions. For example, the irrelevance attendance group can further include conditions of optioners in addition to a superintendent, a sponsor, the number of legislative members, and a quorum.

A member corresponding to the optioner is the subject whose attendance at a meeting is not so much important and may be a very small numerical value. Here, the conditions of the number of legislative members and the quorum have different values depending on the determination of a sponsor who is a substantial operator of the first cyber or real community.

As described above, the subjects registered as members for each cyber or real community are classified into the subjects within the attendance groups and registered with the attendance group DB 121 of the present invention. Here, the attendance groups are utilized in the order-of-priority algorithm of the scheduler server 122.

That is, the scheduler server 122 of the present invention functions to sequentially assign the order of priority to the essential attendance group, the selective attendance group, and the irrelevance attendance group registered with the attendance group DB 121, determine whether the number of members is satisfied or not for each attendance group according to the order of priority, and determine a meeting date that has been selected the most, from pieces of information on a plurality of meeting dates known to all the members of the cyber or real community 131, by way of a sorting process in order of increasing participants for each degree of importance. Here, if, as a result of the determination, the number of members is satisfied.

For example, a sponsor informs all the members of a first cyber or real community of information on a meeting schedule including a plurality of meeting dates, purports, objects, and places. Next, each subject of members who have consented agree to a meeting verifies whether a superintendent, a sponsor, and the number of legislative members satisfy the defined number of members of the essential attendance group or not. If, as a result of the verification, the superintendent, the sponsor, and the number of legislative members satisfy the defined number of members of an essential attendance group, each subject verifies whether the superintendent, the sponsor, and the number of legislative members satisfy the number of members of the selective attendance group or not. If, as a result of the verification, the superintendent, the sponsor, and the number of legislative members satisfy the number of members of the selective attendance group, each subject verifies whether the superintendent, the sponsor, and the number of legislative members satisfy the number of members of the irrelevance attendance group or not. A meeting date will be determined by checking the degree of participation for each level of each member according to a result of the verification and a meeting date selected with the highest frequency.

If the number of members within the essential attendance group is not satisfied, the meeting itself will be inevitably cancelled.

As described above, the scheduler server 122 officially informs each member of a meeting schedule in order to rapidly determine a meeting for each cyber or real community established in an SNS site and checks an intention of each member through the scheduling algorithm. Accordingly, a new form of SNS can be expected.

Furthermore, each of the plurality of scheduler terminal groups 200 and 300 of the present invention downloads an SNS site, registers a person as a member of each cyber or real community within the SNS site or cancels the member of each cyber or real community within the SNS site, and decides its own meeting intension in response to a meeting schedule when the meeting schedule is received. The plurality of scheduler terminal groups 200 and 300 includes a plurality of first group scheduler terminals 200 which has subscribed to a first cyber or real community and a plurality of second group scheduler terminals 300 which has subscribed to an $N^{th}$ cyber or real community.

Each of the scheduler terminals 200 and 300 for each cyber or real community is connected to the SNS scheduling server 100 over wired/wireless communication networks, and each of the scheduler terminals 200 and 300 can exchange desired data in its cyber or real community. For example, each of scheduler terminals 210, 220, and 230 included in the first group scheduler terminal 200 can be any one of a PC, a mobile terminal, and a tablet PC.

For example, the first scheduler terminal 210 may be a PC 211 in the case of a wired communication network, and the first scheduler terminal 210 may be either a mobile terminal 212 (e.g., a smart phone, a 3G terminal, or a 4G terminal) or a tablet terminal 213 in case of a wireless communication network.

Likewise, the second group scheduler terminal 300 is the same as the first group scheduler terminal 200, and scheduler terminals 310, 320, and 330 included in the second group scheduler terminal 300 are the same as the scheduler terminals 210, 220, and 230 included in the first group scheduler terminal 200. The SNS server 120 is described in more detail below.

Example of the SNS Server

Figure 2:
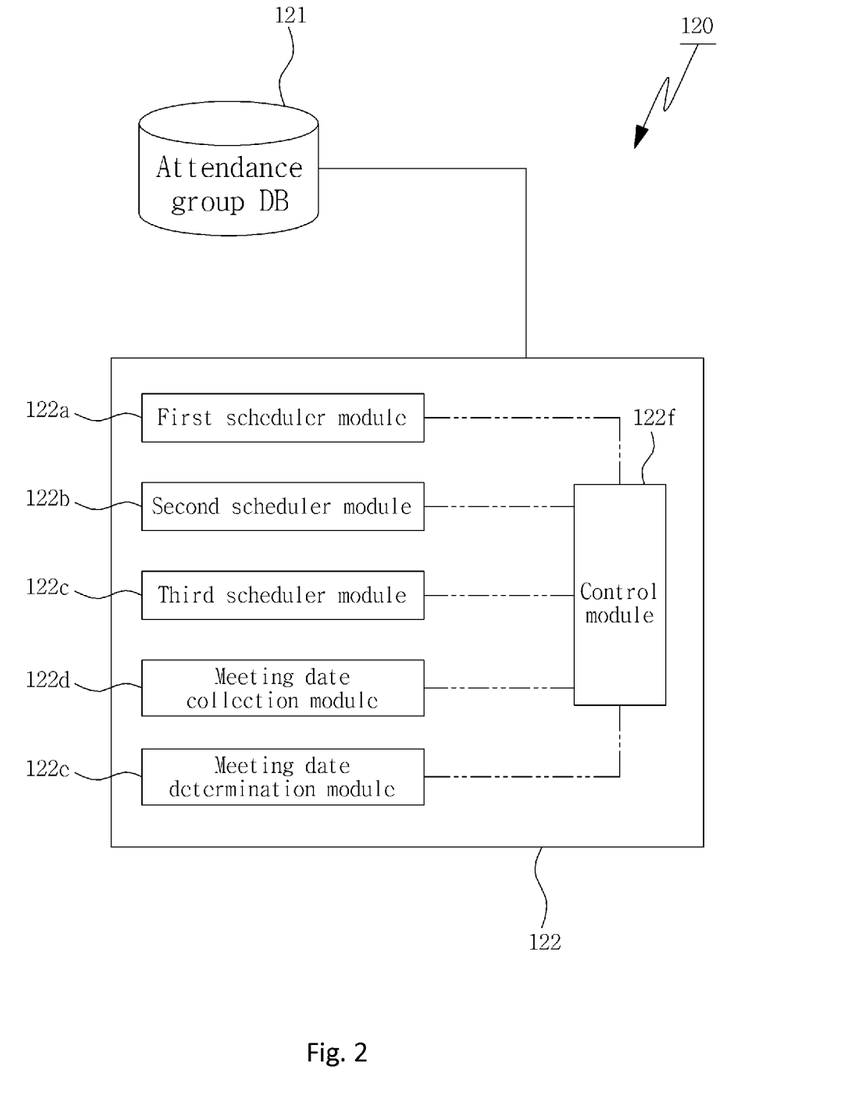
FIG. 2 shows a detailed construction of an SNS server 120 in accordance with the first embodiment of the present invention.

FIG. 2 shows a detailed construction of the SNS server 120 in accordance with the first embodiment of the present invention.

As shown in FIG. 2, the SNS server 120 in accordance with the first embodiment of the present invention includes the attendance group DB 121 and the scheduler server 122, as described with reference to FIG. 1. The scheduler server 122 includes a first scheduler module 122a, a second scheduler module 122b, a third scheduler module 122c, a meeting date collection module 122d, a meeting date determination module 122e, and a control module 122f.

Each of the elements of the scheduler server 122 is described below. First, when the attendance group DB 121 registers a sponsor, a superintendent, and legislative members, from among the members of the cyber or real community 131, as an essential attendance group, the first scheduler module 122a of the present invention functions to check whether the number of members is satisfied or not by checking whether the number of members including the sponsor, the superintendent, and the legislative members within the essential attendance group falls within a predetermined numerical value or not.

For example, the first scheduler module 122a of the present invention can check whether the number of members within the essential attendance group is satisfied or not based on the number of members who have determined a meeting and the decision-making of each of the members (e.g., whether each member has accepted the meeting or not and a meeting date).

The second scheduler module 122b of the present invention is a module that is executed only when a result of the determination of the first scheduler module 122a is satisfied. When the attendance group DB 121 registers a sponsor, a superintendent, legislative persons, and a quorum, from among the members of the cyber or real community 131, as a selective attendance group, the second scheduler module 122b of the present invention functions to check whether the number of members is satisfied or not by checking whether the number of members including the sponsor, the superintendent, the legislative members, and the quorum within the selective attendance group falls within a predetermined numerical value or not.

For example, the second scheduler module 122b of the present invention can check whether the number of members within the selective attendance group is satisfied or not based on the number of members who have determined a meeting and the decision-making of each of the members (e.g., whether each member has accepted the meeting or not and a meeting date).

The third scheduler module 122c of the present invention is a module that is executed only when a result of the determination of the second scheduler module 122b is satisfied. When the attendance group DB 121 registers a sponsor, a superintendent, legislative persons, a quorum, and optioners, from among the members of the cyber or real community 131, as an irrelevance attendance group, the third scheduler module 122c of the present invention functions to check whether the number of members is satisfied or not by checking whether the number of members including the sponsor, the superintendent, the legislative members, the quorum, and the optioners within the irrelevance attendance group falls within a predetermined numerical value or not.

For example, the third scheduler module 122c of the present invention can check whether the number of members within the irrelevance attendance group is satisfied or not based on the number of members who have determined a meeting and the decision-making of each of the members (e.g., whether each member has accepted the meeting or not and a meeting date).

Furthermore, the meeting date collection module 122d of the present invention functions to receive a plurality of meeting dates generated at the request of a superintendent of the cyber or real community 131, transfer the plurality of meeting schedules to all the members of the cyber or real community 131, and collect meeting dates selected by the members of the cyber or real community 131 (substantially from the scheduler terminals). The meeting dates can be provided as basic data for the scheduler modules 122a, 122b, and 122c.

In contrast, the meeting date determination module 122e of the present invention functions to incorporate information on a meeting date that has been selected the most, from among the meeting dates collected by the meeting date collection module 122d, into determination made by each of the scheduler modules 122a, 122b, and 122c and determine a meeting. A result of the determination of the meeting date determination module 122e is transferred to all the members of the cyber or real community 131.

Furthermore, the control module 122f of the present invention functions to control the flow of data between the attendance group DB 121, the first scheduler module 122a, the second scheduler module 122b, the third scheduler module 122c, the meeting date collection module 122d, and the meeting schedule determination module 122e.

As a result, in the present embodiment, a new form of SNS can be expected because intentions of various members for the organization of a meeting in each cyber or real community can be immediately checked and a meeting can be determined based on the intentions.

Second Embodiment

Figure 3:
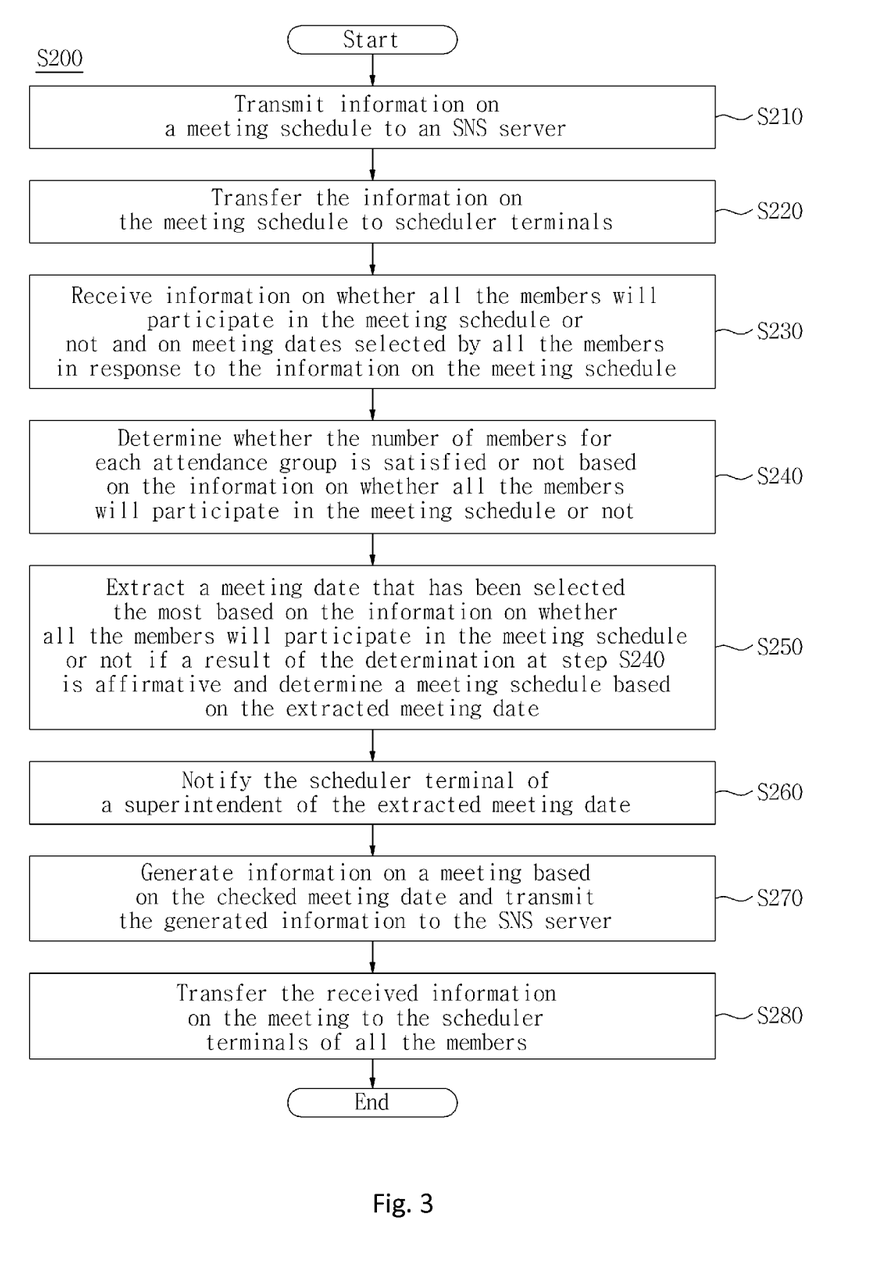
FIG. 3 is an exemplary diagram illustrating a scheduling method S200 in a cyber or real community in accordance with a second embodiment of the present invention.

FIG. 3 is an exemplary diagram illustrating a scheduling method S200 in a cyber or real community in accordance with a second embodiment of the present invention.

As shown in FIG. 3, the scheduling method S200 in a cyber or real community in accordance with the second embodiment of the present invention includes transmitting information on a meeting schedule to the SNS server 120 at step S210, the SNS server 120 transferring the information on the meeting schedule to the scheduler terminals 200 and 300 at step S220, the SNS server 120 receiving information on whether all the members will participate in the meeting schedule or not (i.e., whether all the members have accepted the meeting schedule or not) and on meeting dates selected by all the members in response to the information on the meeting schedule at step S230, the SNS server 120 determining whether the number of members for each attendance group is satisfied or not based on the information on whether all the members will participate in the meeting schedule or not at step S240, and the SNS server 120 extracting a meeting date that has been selected the most based on the information on whether all the members will participate in the meeting schedule or not if a result of the determination at step S240 is affirmative, and the SNS server 120 determining a meeting schedule based on the extracted meeting date at step S250.

First, at the step S210 of the present invention, a superintendent, from among members who have subscribed to a specific cyber or real community 310, selects a meeting object, a meeting place, and a plurality of meeting dates and times and sends information on a generated meeting schedule to the SNS server 120. Here, the superintendent is a member who substantially controls and manages a first cyber or real community, for example, and may announce a meeting, receive an answer to the official announcement, and participate in the determination of a meeting.

Next, at the step S220 of the present invention, the SNS server 120 transfers information on the received meeting schedule to the scheduler terminals 200 and 300 which are owned by all the members of the cyber or real community 310. Next, at the step S230 of the present invention, the SNS server 120 receives information on whether the members will participate in the meeting or not and on the meeting dates, which are generated in response to the information on the meeting schedule, from the scheduler terminals 200 and 300 which have checked the information on the meeting schedule. The information on whether the members will participate in the meeting or not and on the meeting dates includes decision-making contents selected by all the members of the cyber or real community 310.

Next, at the step S240 of the present invention, the SNS server 120 determines whether the number of members for each attendance group that has been defined according to the order of priority is satisfied or not based on the information on whether the members will participate in the meeting or not at the S230. Here, the attendance groups include an essential attendance group, a selective attendance group, and an irrelevance attendance group. Each of the essential attendance group, the selective attendance group, and the irrelevance attendance group and a determination algorithm have been described with reference to FIGS. 1 and 2, and thus a description thereof is omitted.

Next, at the step S250 of the present invention, if a result of the determination at the step S240 is affirmative, the SNS server 120 extracts a meeting date that has been selected the most based on information on a first meeting date that has been sent by members who will participate in the meeting, from among pieces of information on the meeting dates, and determines a meeting schedule based on the extracted meeting date.

Meanwhile, the scheduling method S200 in a cyber or real community in accordance with the second embodiment of the present invention may further include the SNS server 120 notifying the scheduler terminals 200 and 300 of the superintendents of the extracted meeting date at step S260, the superintendents generating information on the meeting based on the meeting date checked by the scheduler terminals 200 and 300 and sending the generated information to the SNS server 120 at step S270, and the SNS server 120 transferring the received information on the meeting to the scheduler terminals 200 and 300 of all the members including the scheduler terminals of the members who will participate in the meeting at step S280.

Third Embodiment

Figure 4:
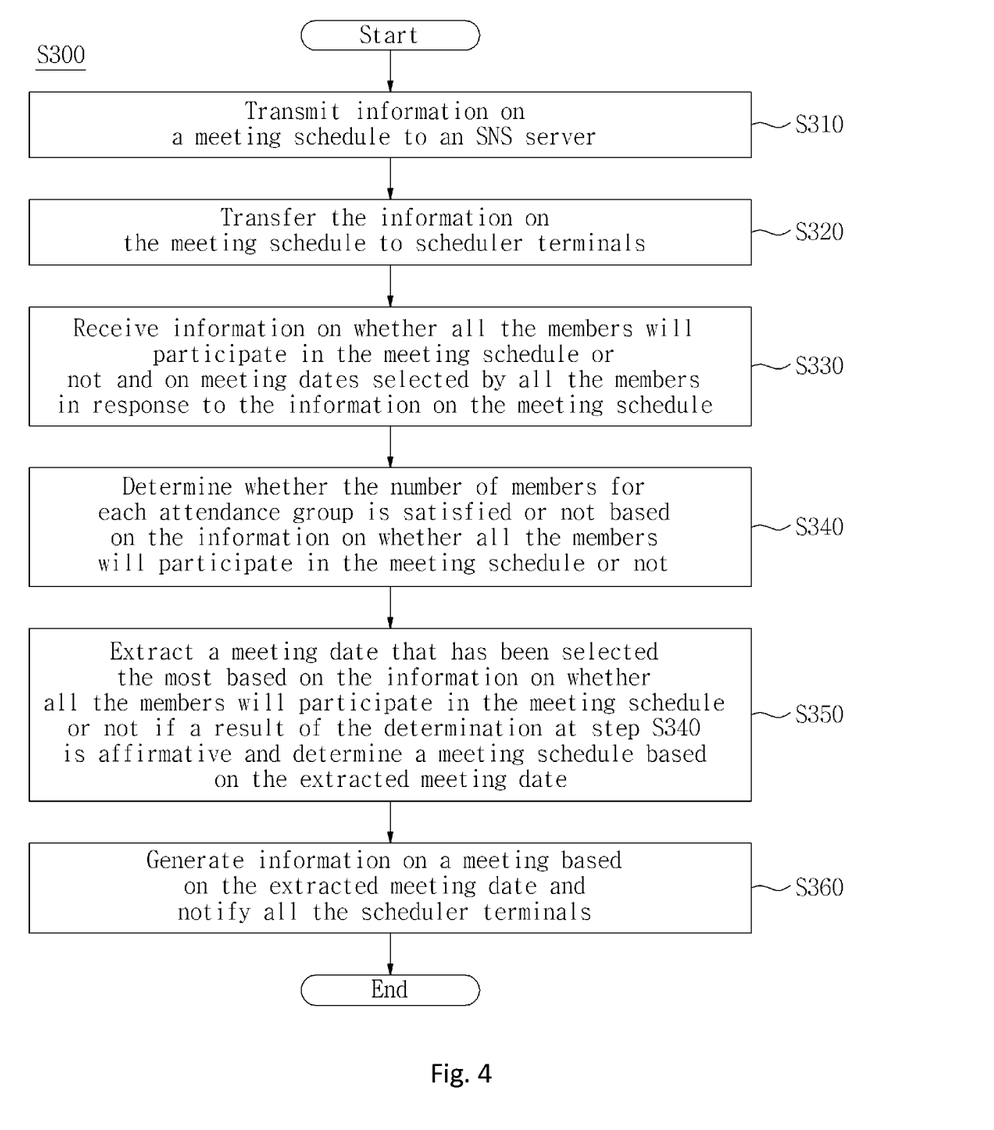
FIG. 4 is an exemplary diagram illustrating a scheduling method S300 in a cyber or real community in accordance with a third embodiment of the present invention.

FIG. 4 is an exemplary diagram illustrating a scheduling method S300 in a cyber or real community in accordance with a third embodiment of the present invention.

As shown in FIG. 4, the scheduling method S300 in a cyber or real community in accordance with the third embodiment of the present invention includes sending information on a meeting schedule to the SNS server 120 at step S310, the SNS server 120 transferring the information on the meeting schedule to the scheduler terminals 200 and 300 or a variety of devices at step S320, the SNS server 120 receiving information on whether all the members will participate in a meeting or not (i.e., all the members accept the meeting or not) and on meeting dates in response to the information on the meeting schedule at step S330, the SNS server 120 determining whether the number of members for each attendance group is satisfied or not based on the information on whether all the members will participate in a meeting or not at step S340, the SNS server 120 extracting a meeting date that has been selected the most based on the information on whether all the members will participate in a meeting or not if a result of the determination at the step S340 is affirmative and determining the meeting schedule based on the extracted meeting date at step S350, and the SNS server 120 generating information on the meeting based on the extracted meeting date and notifying the scheduler terminals 200 and 300 of all the members including the scheduler terminal of the superintendents of the information on the meeting at step S360.

Here, the remaining steps other than the step S360 are the same as those of FIG. 3 and thus a description thereof is omitted. Unlike at the steps S260, S270, and S280 of FIG. 3, at the step S360 that is the last step of the present invention, the SNS server 120 automatically generates information on the meeting and automatically notifies all the scheduler terminals 200 and 300 of the generated information. That is, a process of a superintendent generating the information on the meeting is omitted, and instead the SNS server 120 automatically generates the information on the meeting and sends the generated information to all the scheduler terminals 200 and 300.

As described above, in the method in accordance with the second embodiment or the third embodiment of the present invention, when a superintendent notifies a meeting in a specific cyber or real community, decision-making collected from all the members of the cyber or real community is determined according to the order of priority and all the members including the superintendent is rapidly informed of a result of the determination. Accordingly, there is an advantage in that a new form of a meeting process that cannot be seen in the existing SNS can be provided.

In accordance with the present invention, a meeting is easily notified in each cyber or real community in which bidirectional communication is performed, intentions of all members are taken into consideration in real time, and a scheduling algorithm, that is, a predetermined route, is used so that a meeting can be rapidly organized. Accordingly, there is an advantage in that a new form of a cyber or real community meeting environment can be formed unlike a cyber or real community environment having the existing simple communication form.

Furthermore, in accordance with the present invention, the schedules of other members associated with oneself over a bidirectional network are automatically registered and changed depending on his or her schedule, and a change of other members' schedules affects his or her schedule, thereby enabling a rapid response. Accordingly, there is an advantage in that a meeting can be optimally organized in a cyber or real community.

Accordingly, profits can be made from a viewpoint of an initiator because a new form of SNS is made possible. Furthermore, profits may be maximized by adding advertisement and events to SNS for the organization of a meeting.

While some embodiments of the invention have been described with reference to the accompanying drawings, a person having ordinary skill in the art to which the present invention pertains will appreciate that the present invention can be implemented into other detailed forms without changing the technical spirit or essential characteristics of the present invention. Accordingly, the above embodiments should be construed as being illustrative and as not being limitative from all aspects.

What is claimed is:

1. A cyber or real community scheduler system, comprising:
   a member information database (110) for distinguishing a plurality of cyber or real communities established in a Social Networking Service (SNS) site from one another and managing and storing information on members of the cyber or real communities; and
   an SNS server (120) for providing the SNS to the members of each of the cyber or real communities based on the information on the members of the cyber or real communities, wherein the SNS server (120) comprises:
   an attendance group database (121) for registering each of the members as belonging to an essential attendance group, a selective attendance group, or an irrelevance attendance group based on the information on the members of the cyber or real communities, wherein the essential attendance group comprises a superintendent, a sponsor, and one or more legislative members, wherein the selective attendance group comprises the superintendent, the sponsor, the one or more legislative members, and a quorum, and wherein the irrelevance attendance group comprises the superintendent, the sponsor, the legislative members, the quorum, and a plurality of optioners; and
   a scheduler server (122) for sequentially assigning an order of priority to the essential attendance group, the selective attendance group, and the irrelevance attendance group and determining a preferred meeting date that has been selected the most from a plurality of meeting dates when a number of members of each attendance group according to the order of priority is satisfied, wherein the essential attendance group has a highest priority, the selective attendance group has the second highest priority, and the irrelevance attendance group has the lowest priority,
   wherein the scheduler server (122) comprises a first scheduler module (122a) for determining whether the number of the sponsor, the superintendent, and the legislative members in the essential attendance group falls within a range of a first predetermined numerical value or not; a second scheduler module (122b) for determining whether the number of the sponsor, the superintendent, the legislative members, and the quorum in the selective attendance group falls within a range of a second predetermined numerical value or not; and a third scheduler module for determining whether the number of members of the sponsor, the superintendent, the legislative members, the quorum, and the number of optioners in the irrelevance attendance group falls within a range of a third predetermined numerical value or not,
   wherein the first, the second, and the third predetermined numerical values are less than a total number of members in the essential attendance group, in the selective attendance group, and in the irrelevance attendance group, respectively.

2. The cyber or real community scheduler system of claim 1, wherein the scheduler server (122) further comprises:
   a meeting date collection module (122d) for receiving the plurality of meeting dates generated at the request of the superintendent of a specific cyber or real community, transferring the meeting schedules to members of the specific cyber or real community, and collecting meeting dates selected by the members of the specific cyber or real community in response to the transfer; and
   a meeting date determination module (122e) for incorporating information on the preferred meeting date from among information on the meeting dates collected by the meeting date collection module, into an affirmative determination corresponding to a range of a numerical value and transferring information on whether a meeting will be organized or not to all the member of the specific cyber or real community.

3. A scheduling method in a cyber or real community, comprising the steps of:
   (a) a Social Networking Service (SNS) server (120) receiving information on a meeting date, comprising a meeting object, a meeting place, and a plurality of meeting dates and times, from a superintendent of a cyber or real community;
   (b) the SNS server (120) transferring the received information on the meeting dates to scheduler terminals or a variety of devices of all the members of the cyber or real community;
   (c) the SNS server (120) receiving information on whether all the members of the cyber or real community will participate in a meeting or not and on meeting dates selected by all the members in response to the information on the meeting dates;
   (d) the SNS server (120) determining whether a number of members for each of an essential attendance group, a selective attendance group, and an irrelevance attendance group defined according to an order of priority is satisfied or not, wherein the essential attendance group has a highest priority, the selective attendance group has the second highest priority, and the irrelevance attendance group has the lowest priority; and
   (e) when a result of the determination at the step (d) is affirmative, the SNS server (120) extracting a meeting date that has been selected the most based on information on a first meeting date transmitted by members who will participate in the meeting, from among pieces of information on the meeting dates, and determining a meeting schedule based on the extracted meeting date,
   wherein the essential attendance group comprises a superintendent, a sponsor, and a plurality of legislative members, wherein the selective attendance group comprises the superintendent, the sponsor, the legislative members, and a quorum, wherein the irrelevance attendance comprises the superintendent, the sponsor, the legislative members, the quorum, and a plurality of optioners;
   wherein, in step (d), a scheduler server (122) first determines whether the number of the sponsor, the superintendent, and the legislative members in the essential attendance group falls within a range of a first predetermined numerical value or not,
   second, the scheduler server (122) determines whether the number of the sponsor, the superintendent, the legislative members, and the quorum in the selective attendance group falls within a range of a second predetermined numerical value or not,
   third, the scheduler server (122) determines whether the number of members of the sponsor, the superintendent, the legislative members, the quorum, and the number of optioners in the irrelevance attendance group falls within a range of a third predetermined numerical value or not.

4. The scheduling method of claim 3, further comprising the steps of:
   (f) the SNS server (120) notifying a scheduler terminal or a variety of the devices of the superintendent of the extracted meeting date;
   (g) the superintendent generating information on the meeting based on the meeting date checked by the scheduler terminal or a variety of the devices and transmitting the generated information to the SNS server (120); and
   (h) the SNS server (120) transferring the received information on the meeting to the scheduler terminals of all the members including the scheduler terminals of the subjects who will participate in the meeting.

5. The scheduling method of claim 3, further comprising the step of (i) the SNS server (120) generating information on the meeting based on the extracted meeting date and notifying the scheduler terminals of all the members, including a scheduler terminal of the superintendent, of the information on the meeting.

6. The scheduling method of claim 3, wherein the information on the meeting schedule comprises information on a meeting object, a meeting place, and a plurality of meeting dates and times.

* * * * *